United States Patent
Nabeiro et al.

(10) Patent No.: US 11,330,932 B2
(45) Date of Patent: May 17, 2022

(54) ERGONOMIC BEVERAGE DISCHARGE DISPOSITION, BEVERAGE PREPARATION MACHINE WITH SAID BEVERAGE DISCHARGE DISPOSITION AND PROCESS OF OPERATION OF SAID MACHINE

(71) Applicant: NOVADELTA—COMÉRCIO E INDÚSTRIA DE CAFÉS S.A., Lisbon (PT)

(72) Inventors: Rui Miguel Nabeiro, Campo Maior (PT); João André De Figueiredo Branco, Moscavide (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 494 days.

(21) Appl. No.: 16/332,522

(22) PCT Filed: Sep. 12, 2017

(86) PCT No.: PCT/PT2017/050019
§ 371 (c)(1),
(2) Date: Mar. 12, 2019

(87) PCT Pub. No.: WO2018/052328
PCT Pub. Date: Mar. 22, 2018

(65) Prior Publication Data
US 2021/0274961 A1    Sep. 9, 2021

(30) Foreign Application Priority Data
Sep. 13, 2016    (PT) .......................................... 109610

(51) Int. Cl.
*A47J 31/44*    (2006.01)

(52) U.S. Cl.
CPC ....... *A47J 31/4485* (2013.01); *A47J 31/4407* (2013.01); *A47J 31/4496* (2013.01); *A47J 31/4489* (2013.01)

(58) Field of Classification Search
CPC . A47J 31/4496; A47J 31/4489; A47J 31/4485
(Continued)

(56) References Cited

U.S. PATENT DOCUMENTS

2012/0125202 A1* 5/2012 Remo ..................... A47J 31/60
99/286

FOREIGN PATENT DOCUMENTS

| CA | 3002572 A1 * | 4/2017 | .......... A47J 31/4403 |
| CN | 203 693 334 U | 7/2014 | |

(Continued)

OTHER PUBLICATIONS

International Search Report for PCT/PT2017/050019 dated Jan. 30, 2018.
Written Opinion for PCT/PT2017/050019 dated Jan. 30, 2018.

*Primary Examiner* — Reginald Alexander
(74) *Attorney, Agent, or Firm* — Sughrue Mion, PLLC

(57) ABSTRACT

The present invention discloses a beverage discharge disposition comprising a discharge casing (1) configured so that can be provided in the front region of a beverage preparation machine (20), including the option of supplying milk and frothed milk, whereby said discharge casing (1) presents a milk circulation disposition (2) adapted so as to provide an ergonomic use of a beverage preparation machine, in particular the possibility of dismounting and mounting said milk circulation disposition (2) for periodic cleaning thereof. The present invention further discloses a beverage preparation machine (20) and a process for operating said machine (20), in particular of a respective ergonomic beverage discharge disposition, according to the present invention.

14 Claims, 3 Drawing Sheets

(58) Field of Classification Search
USPC .................................................. 99/293, 323.1
See application file for complete search history.

(56) References Cited

FOREIGN PATENT DOCUMENTS

| | | | |
|---|---|---|---|
| EP | 2 497 397 A1 | 9/2012 | |
| EP | 2 965 671 A1 | 1/2016 | |
| EP | 3 000 362 A1 | 3/2016 | |
| EP | 3023038 A1 * | 5/2016 | .......... A47J 31/4485 |
| WO | 2016/005304 A1 | 1/2016 | |

* cited by examiner

ERGONOMIC BEVERAGE DISCHARGE DISPOSITION, BEVERAGE PREPARATION MACHINE WITH SAID BEVERAGE DISCHARGE DISPOSITION AND PROCESS OF OPERATION OF SAID MACHINE

CROSS REFERENCE TO RELATED APPLICATIONS

This application is a National Stage of International Application No. PCT/PT2017/050019 filed Sep. 12, 2017, claiming priority based on Portuguese Patent Application No. 109610 filed Sep. 13, 2016.

FIELD OF THE INVENTION

The present invention refers to the field of the beverage discharge dispositions associated with beverage preparation machines and presenting discharge means for a first type of beverage, including coffee, and a second type of beverage, including a milk-based beverage.

The present invention further refers to a beverage preparation machine, in particular adapted so that can prepare a first type of beverage, for example coffee, based upon a portion of edible substance supplied to a brewing device, and a second type of milk-based beverage, as well as further refers to a process of operation of a machine for preparing beverages according to the present invention.

BACKGROUND OF THE INVENTION

The prior art presents several solutions of beverage preparation machines with a first beverage discharge, for example espresso type coffee, and a second beverage discharge, for example milk, whereby said second beverage discharge is provided from a connection to an exterior recipient, in particular to an exterior milk recipient and adapted so that a flow is sucked from said exterior recipient by means of a pressurized flow flowing through said first discharge.

Document EP 1746920 B1 discloses a beverage preparation system of the type of the present invention, comprising a beverage preparation machine and a milk supply recipient, whereby the machine presents a discharge disposition comprising a first vapour discharge line and a second milk discharge line, whereby said second line is provided in connection with said milk supply recipient.

Documents EP 1785074 B1 and EP 2275010 B1 disclose discharge dispositions of the same type and comprising electronic means for flow regulation by means of a machine control unit.

Documents EP 0813834 B1 discloses a discharge disposition comprising mechanical means of flow regulation. Said mechanic means present several advantages in terms of simplicity and reliability.

Document EP 2189085 B1 discloses a frothing unit that can be removed as a unit, so that can be cleaned separately.

Document WO 2013/128323 A1 discloses a beverage preparation machine that presents a discharge disposition of the type of the present invention.

Document U.S. Pat. No. 5,738,002 disclose a self-cleaning attachment for espresso coffee machine, for combining vapour, milk and air so as to produce hot frothed milk, whereby said attachment can be cleaned without being dismounted or disconnected from the espresso coffee machine, by means of reversal of the flow flux through the milk and air supply means.

Document US 2010/0199851 A1 discloses a milk carrying device, with a milk frothing disposition including a vapour supply, a cold milk supply and an ambient air supply similar to the present invention.

Document WO 2012/117399 A1 discloses a beverage preparation machine of the type of the present invention that comprises a beverage discharge that comprises an upstream mixture chamber and flow path, at least three beverage supply lines at at least three previously defined temperatures into said chamber, and a controller for controlling the supply by each of said supply lines.

Document WO 2015/102126 discloses a device for producing a milk-based beverage, and associated with a beverage preparation machine that presents a removable flow connection with an exterior milk supply recipient.

Document US 2013/0019903 A1 discloses a beverage preparation machine of the type of the present invention that presents a flow regulation button of the frothed milk discharge flow that provides a continuous regulation of said flow by means of rotation around a central axis of said button.

The simple and compact construction of the milk frothing means, the regulation of milk discharge flow, as well as the cleaning of those parts that contact with milk, are important problems in this type of beverage discharge disposition.

General Description of the Invention

The objective of the present invention is to provide a beverage discharge disposition provided as front part of a beverage preparation machine and comprising means adapted for discharge of a first type of beverage, in particular of aromatic beverages such as for example espresso type coffee, and means adapted for frothing of a liquid food product, in particular milk, said disposition presenting a simpler, more compact construction, in particular so that can be easily mounted and dismounted by a user, so that can be effortlessly periodically cleaned by a user, as well as simpler and more ergonomic flow regulation means.

This objective is attained according to the present invention by means of a beverage discharge disposition according to claim 1.

Said beverage discharge disposition comprises a discharge casing that presents an attached part and a milk circulation disposition provided as a part that can be attached in removable manner to said attached part.

In particular, there is provided a construction of discharge casing that comprises an attached part and a removable part that corresponds to a milk circulation disposition comprising all the means of said machine directly exposed to the passage of milk, adapted so that can be attached in removable manner to said attached part, whereby said removable part includes a preferentially pressure-fitting type connection to a vapour supply provided on said attached part, is disposed on a lateral region and presents a volume that is smaller than half of the volume defined by said discharge casing, thereby facilitating a periodic removal for cleaning.

The beverage discharge disposition according to the present invention comprises a discharge casing that provided discharge of a first and second type of beverages, and means associated with frothing of milk including a vapour supply, generated by means upstream inside of the machine, a cold milk supply, supplied from an exterior supply recipient, and ambient air supply, whereby said means provide an interaction between said flows and are provided on said discharge casing on a side region and with a volume that is smaller than the volume of said discharge casing.

A related objective of the present invention is to provide a beverage preparation machine, in particular of aromatic beverages such as for example espresso type coffee, comprising a brewing device adapted for collecting a portion of edible substance, optionally provided inside of a capsule, and a beverage discharge regulation disposition adapted so as to provide a simpler, more compact and ergonomic construction.

This objective is attained by means of a machine according to claim 13.

Another objective of the present invention is to provide a process for preparing beverages that provides better ergonomic use conditions.

This objective is solved according to claim 14.

DESCRIPTION OF THE FIGURES

The invention shall hereinafter be explained in greater detail based upon preferred embodiments and in the attached Figures.

The Figures show, in simplified schematic representations:

FIG. 1 represents a machine (20) for preparing beverages, including aromatic beverages, from an edible substance, such as for example espresso coffee, tea and similar, as well as a liquid food product that can be frothed, in particular milk.

The machine (20) is adapted for flow connection from a respective beverage discharge connection, said disposition including a discharge casing (1) that corresponds to the piece provided on the front region of said machine (20), and that provides discharge of at least two types of beverages into a recipient underneath thereof.

Said discharge casing (1) presents selection means (5) of beverage type on a front region above of said beverage discharge, and presents flow connection means provided so that can be removed, with a milk recipient (6) disposed outside of said machine (20).

Moreover, in particular, said machine (20) presents a preferred embodiment of a beverage discharge disposition according to the present invention, that comprises a discharge casing (1) of beverage discharge configured so that can be provided in the front region of said beverage preparation machine (20) and that provides a more ergonomic use, both in terms of selection of type of milk flow, as in terms of easy mounting and dismounting of the parts in contact with milk for periodic cleaning thereof, as shall be described in greater detail hereinafter.

Figure 1:
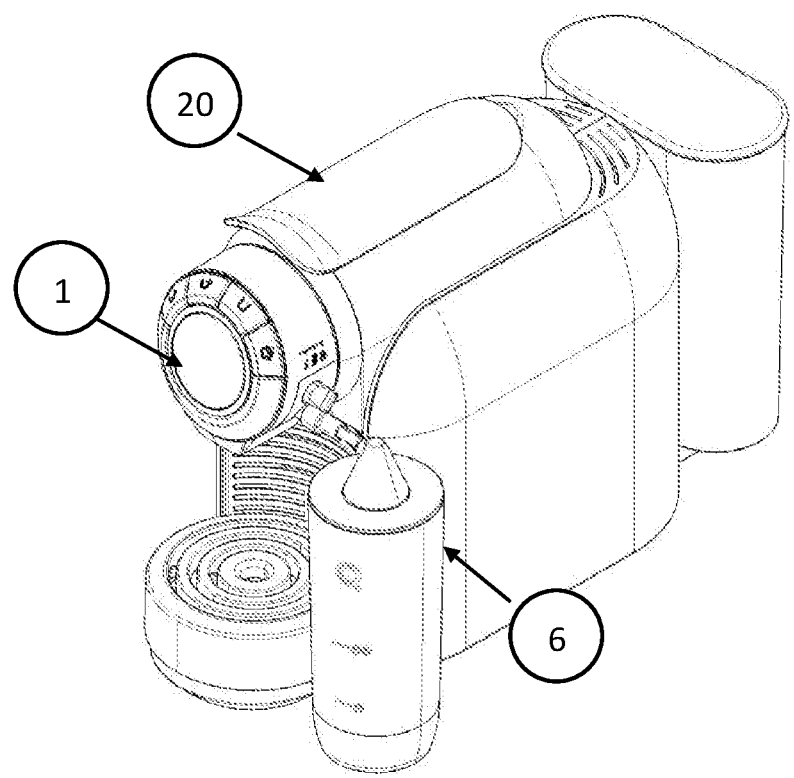
FIG. 1: perspective view of a beverage preparation machine presenting a preferred embodiment of beverage discharge disposition according to the present invention.
Figure 2:
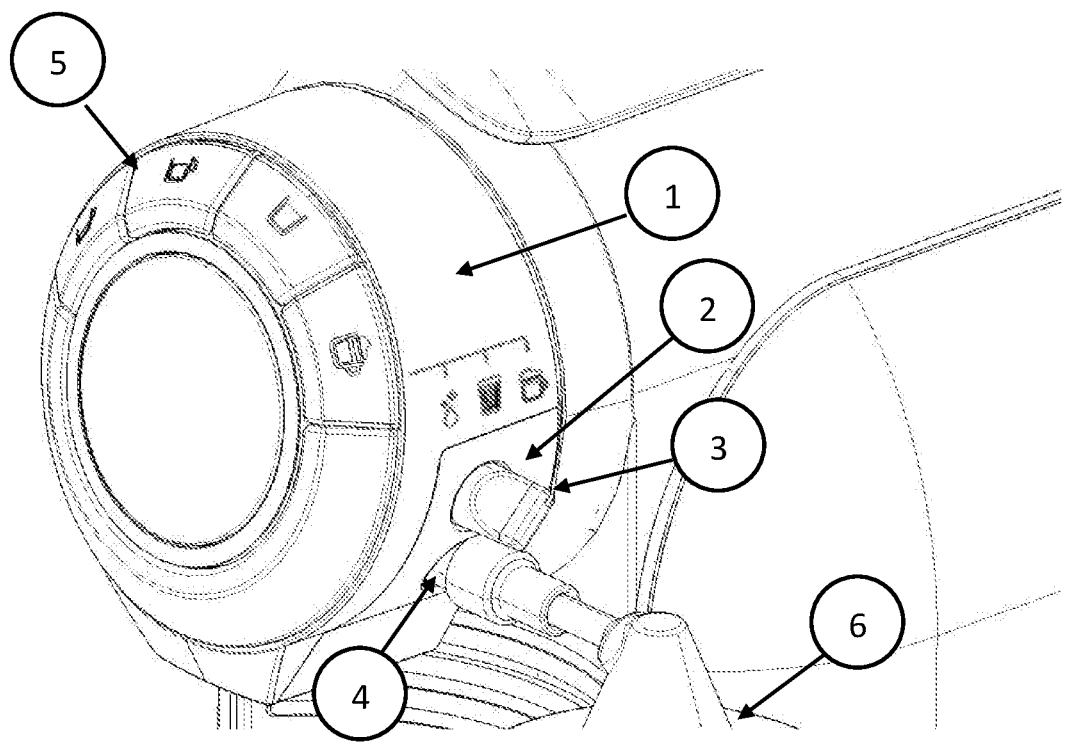
FIG. 2: detail view of preferred embodiment of the beverage discharge disposition according to FIG. 1.

As represented in FIG. 2, according to an inventive aspect, said discharge casing (1) comprises a milk circulation disposition (2) that presents selection means (3) of milk flux.

In particular, according to an inventive aspect, said selection means (3) of milk flux and said selection means (5) of beverage type are provided in different regions and planes of said discharge casing (1), whereby said selection means (3) of milk flux are preferentially provided on a lateral region of said discharge casing (1), and said selection means (5) of beverage type are provided on a front region of said discharge casing (1).

Moreover, it is preferred when said selection means (3) of milk flux are disposed on a region of said milk circulation disposition (2) next to and above of flow connection means, for example in a tube form, of said milk circulation disposition (2) to said milk supply recipient (6).

It is herewith advantageously provided a compact and ergonomic disposition of the main components associated with the regulation by the user of the type of milk flow and the milk supply from an exterior recipient.

It is further preferred that said selection means (3) of milk flux are adapted so that said milk flux selection means (3) are provided so that can be manually actuated between successive positions along an actuation plane that is at least approximately orthogonal relative to the front plane of said discharge casing (1).

It is preferred when said milk flux selection means (3) are adapted so that provide a regulation of air flow, in particular by means of said air valve disposition (10), in the interior of said milk circulation disposition (2) and therewith of the type of milk flow discharged downstream.

Advantageously in terms of usage, said selection means (3) of milk flux are provided so that can be moved along a previously defined path, preferentially around a respective rotation axis, between a plurality of at least two and up to five, preferentially up to three previously defined positions, thereby providing a corresponding variation of the type of discharge flow of said liquid food product to be frothed, whereby at least one position corresponds to a substantially continuous milk flow type and a second position corresponds to a substantially frothed milk flow type.

It is preferred when said milk flux selection means (3) are configured as a rotation button-like element, with side surfaces adapted for placing two opposing fingers so as to drive a rotation thereof.

It is further preferred when said milk flux selection means (3) are provided so that can be moved frontwards and backwards along said path, preferentially along at least one of:

- a linear extension, whereby said extension presents a dimension comprised between 1 and 4 cm, preferentially between 2 and 3 cm;
- an angular extension, whereby said angular extension corresponds to an angle bigger than 5° and smaller than 120°, preferentially bigger than 10° and smaller than 90°.

It is further preferred when there are provided graphic and/or acoustic signals associated with each one of said previously defined positions of said milk flux selection means (3), so that the user can recognize with type of flux is selected at each any given moment.

As further represented in FIG. 2, according to another preferred embodiment, said milk flux selection means (3) are provided on a lateral face of said discharge casing (1), whereas said beverage type selection means (5) are provided on a front face of said discharge casing (1).

Figure 3:
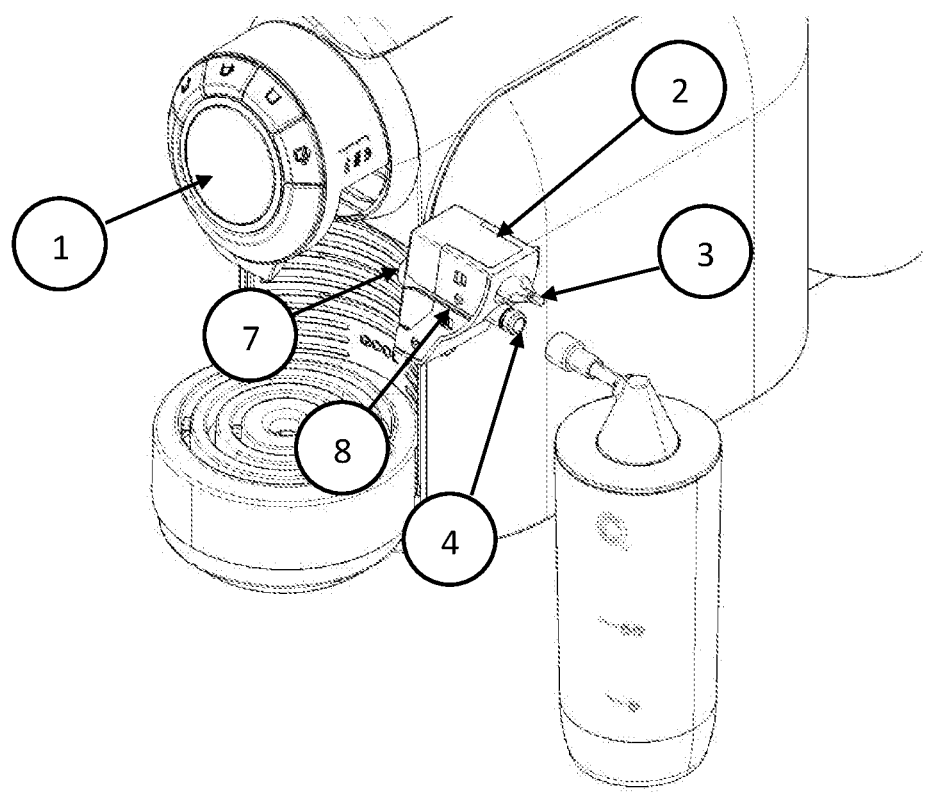
FIG. 3: exploded perspective view of the preferred embodiment of the beverage discharge disposition according to FIG. 1.

As one can better observe in FIG. 3, said discharge casing (1) presents a milk circulation disposition (2) that comprises milk flux selection means (3), a milk entry connection (4) adapted so that provides connection to said milk recipient (6), and a vapour entry connection (7) adapted for flow connection to water vapour supply means, beverage type selection means (5) provided on a different region from said milk circulation disposition (2) and presenting at least one option relative to the use of said liquid food product to be frothed, in particular, milk.

According to an inventive aspect, said discharge casing (1) presents a first part provided attached to the casing of said beverage preparation machine (20), and said milk circulation disposition (2) is provided so that can be manually mounted and dismounted on said attached part of discharge casing (1), thereby providing a removable attachment of all components that are in direct contact with milk to the remanding discharge casing (1), and removable flow connection of said vapour exit nozzle (13) with said second beverage discharge (12).

As shall be promptly understood, it is herewith advantageously provided the possibility of the user to remove all components that are exposed in direct contact with milk, provided in a particularly compact form, as a single joint arrangement, manually removable from the remanding discharge casing, so that enables its periodic cleaning in simple and rapid manner, as well as its placement in expedite and reliable manner.

According to a preferred embodiment, said milk circulation disposition (2) presents a plurality of components placed and removed as a single element, preferentially by means of pressured-fitting, in said attached part of discharge casing (1).

Moreover, it is preferred when said milk circulation disposition (2) is generally provided with a shape and dimension corresponding to a part that is similar or smaller than half the form and general dimension of said discharge casing (1) and that can be fitted on a lateral region of said attached part of the discharge casing (1).

It is preferred when said milk circulation disposition (2) is adapted so that can be placed onto, and removed from, a lateral portion of said attached part of discharge casing (1), by means of displacement in transversal manner relative thereto, preferentially by guiding means (8) provided in opposite regions, for example in lateral regions, and developing along at least part of the extension of said opposing regions of said milk circulation disposition (2), thereby providing establishing, and removal, of flow connection of said vapour entry connection (7) with said vapour exit nozzle (13) provided on said attached part of discharge casing (1).

It is herewith provided the possibility of an easy disassembling and assembling of the milk circulation disposition (2) for the purpose of cleaning, as a single piece. In particular, said milk circulation disposition (2) is adapted so that can be placed for cleaning in a convention dish washing machine.

It is preferred when said vapour exit nozzle (13) is adapted for pressurized-fitting with a vapour entry connection (7) associated with the flow distribution disposition (11).

It is further preferred when said connection to the milk supply recipient (6) includes a milk entry connection (4) adapted for pressurized-fitting between a connection part of milk supply recipient (6) and a connection part of said discharge casing (1).

Moreover, it is preferred when said milk entry connection (4) is provided in flow connection with said milk supply recipient (6) by means of a connection that includes at least one location with possibility of rotation in several planes, preferentially including a spherical kneecap-like point, preferentially including a flexible tube (16) provided for sucking milk from said milk supply recipient (6).

Figure 4:
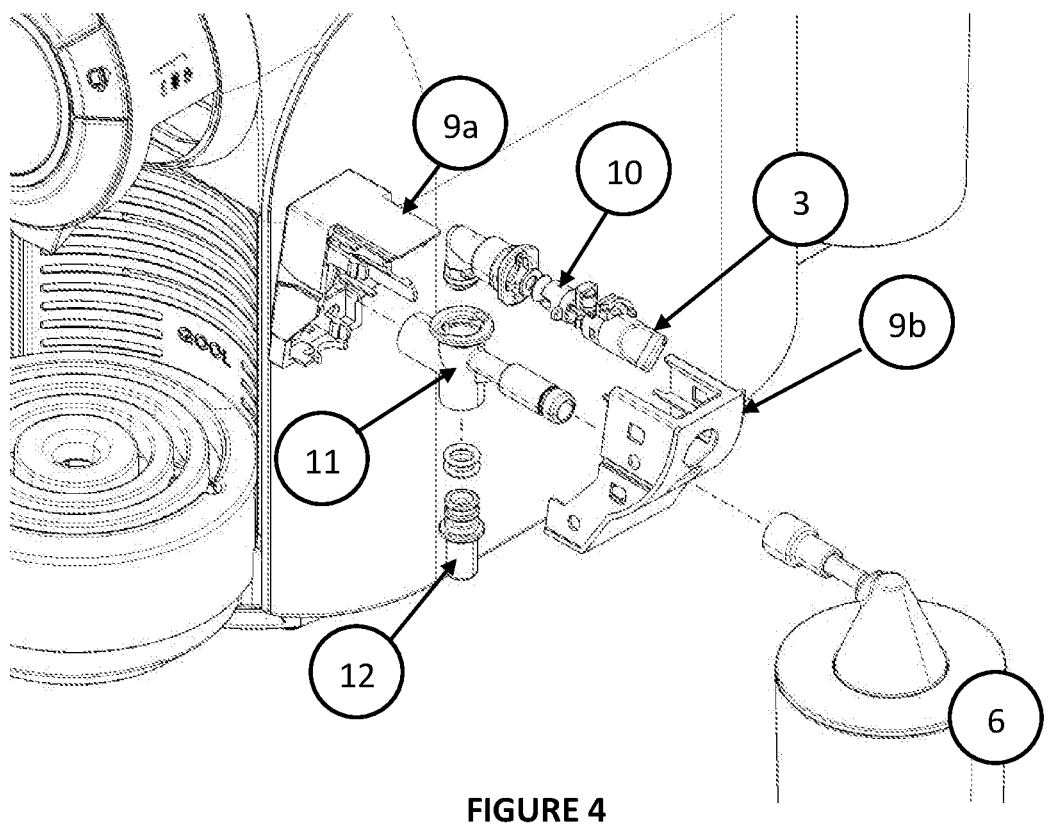
FIG. 4: exploded perspective view of the preferred embodiment of the beverage discharge disposition according to FIG. 1.

According to a preferred embodiment, represented in FIG. 4, said milk circulation disposition (2) presents a first part (9a) adapted so as to provide support to said milk flux selection means (3) and to said milk entry connection (4), and preferentially configured so as to provide an exterior surface that develops in coherent manner in relation to the remanding exterior surface of said discharge casing (1) when said milk circulation disposition (2) is placed in said discharge casing (1), and further presents a second part (9b) adapted so as to provide support to said vapour entry connection (7), whereby said first and second structural parts (9a, 9b) are configured as elements that can be manually pressure-fitted with each other.

It is further preferred when said first and second structural parts (9a, 9b) are adapted so that support an air valve disposition (10), a flow distribution disposition (11) and a milk discharge (12), along a general upstream to downstream direction.

In particular, it is preferred when said milk circulation disposition (2) comprises a flow distribution disposition (11) adapted so that presents said milk entry connection (4) and said vapour entry connection (7), and that provides flow connection, preferentially by means of pressure fitting, with said air valve disposition (10), and with said second beverage discharge (12), whereby said flow distribution disposition (11) is preferentially retained in exterior walls of said first and second structural parts (9a, 9b).

Figure 5:
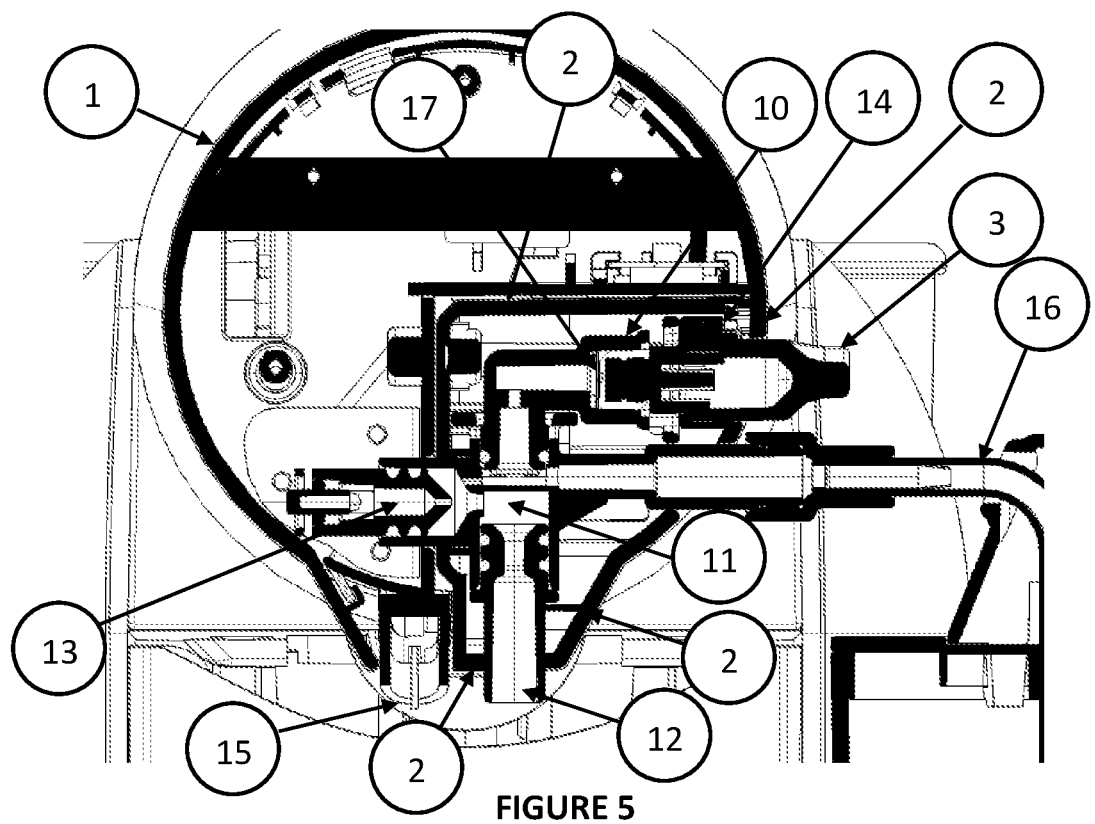
FIG. 5: cut front view of the preferred embodiment of the beverage discharge disposition according to FIG. 1.

FIG. 5 shows an exploded perspective representation of the several components comprised in said milk circulation disposition (2).

According to an inventive aspect, said discharge casing (1) comprises a first fluid discharge line adapted for discharging a first type of beverage and provided in flow connection with an upstream pressurized fluid source, such as for example a pressure pump, and downstream with a first beverage discharge (15) and a second fluid discharge line. Said second fluid discharge line that comprises:
- a first fluid supply adapted for supplying vapour and provided in flow connection upstream with said pressurized fluid source and downstream with a vapour exit nozzle (13),
- a second fluid supply adapted for supplying air and that provides flow connection upstream with an air admission (14) associated with selection means (3) of milk flux that provide regulation of the air flow through an air valve disposition (10), and downstream with a flow distribution disposition (11),
- a third fluid supply adapted for supplying milk and that provides flow connection upstream with a milk supply recipient (6) provided outside of said beverage preparation machine, and downstream with said flow distribution disposition (11).

According to a preferred embodiment, said first, second and third fluid supplies, are provided in flow connection downstream, by means of said flow distribution disposition (11), with a second beverage discharge (12).

It is further preferred when said second and third fluid supplies and respective second fluid discharge (12) are provided so that can be flow connected by means of removable pressure-fitting connection of said flow distribution disposition (11) with said vapour entry connection (7), so that said second and third fluid supplies, flow distribution disposition (11) and second beverage discharge (12) can be jointly removed from connection with said first fluid supply.

Figure 6:
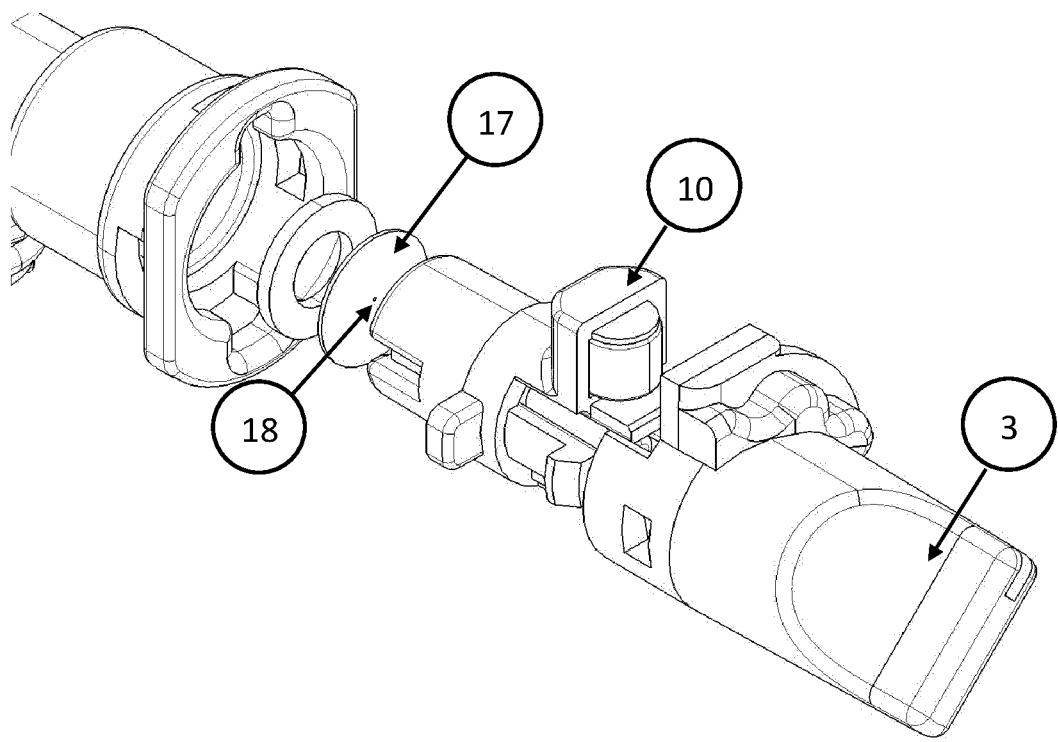
FIG. 6: exploded perspective view of the air valve in the preferred embodiment of the beverage discharge disposition according to FIG. 1.

FIG. 6 represents a detail of said air valve (10). As represented, it is preferred when said air valve disposition (10) comprises a regulation disk (17) of air flux that is provided in a metal, preferentially in a food grade metal alloy.

Lisbon, Sep. 12, 2017

The invention claimed is:

1. A beverage discharge disposition adapted for frothing a liquid food product, in particular milk, comprising:
    a discharge casing (1) provided in a front region of a beverage preparation machine (20),
    wherein said discharge casing (1) comprises:
    an attached part associated to the discharge casing of said beverage preparation machine (20) and that presents selection means (5) of beverage type, including a milk option, and a first beverage discharge (15) for discharge of a first beverage type, such as for example coffee; and
    a part that is removable from the discharge casing (1) and corresponds to a milk circulation disposition (2) providing removable flow connection to an exterior supply recipient (6) to said machine (20), and comprising all components exposed to the milk circulation in said machine (20) including a second beverage discharge (12),
    whereby said milk circulation disposition (2) can be manually attached in a removable manner to said attached part of the discharge casing (1), so that said second beverage discharge (12) is arranged next to said first beverage discharge (15) inside of said discharge casing (1), and
    wherein said milk circulation disposition (2) comprises:
    a milk entry connection (4) that provides connection to a milk supply recipient (6) provided outside of said beverage preparation machine (20),
        a milk froth selection means (3) that provide regulation of the air flow through an air valve disposition (10), and
        a vapour entry connection (7) that provides connection to a vapour supply provided upstream of said discharge casing (1), by means of a vapour exit nozzle (13) provided on said attached part of said discharge casing (1),
    wherein said milk circulation disposition (2) further comprises a second beverage discharge (12) for discharge of the liquid food product to be frothed,
    wherein said milk circulation disposition (2) can be jointly attached in removable manner as single element, preferentially by means of pressure-fitting, in said attached part of discharge box (1), so that said milk circulation disposition (2) thereby has a removable flow connection of said vapour exit nozzle (13) with said second beverage discharge (12), and
    wherein said milk circulation disposition (2) is generally provided with a shell part of form coherent with the remanding shell of the discharge box (1) and with a volume that is smaller than half the volume of said discharge box (1) and can be fitted on a side region of said attached part of beverage box (1).

2. The beverage disposition according to claim 1, wherein said milk circulation disposition (2) can be attached in removable manner to a lateral portion of said attached part of discharge casing (1), by means of displacement in transversal manner relative thereto, preferentially by guiding means (8) provided in opposite regions, and developing along at least part of the extension of said opposite regions of said milk circulation disposition (2), thereby providing establishing and removal of flow connection of said vapour entry connection (7) with said vapour exit nozzle (13) provided on said attached part of discharge casing (1).

3. The beverage disposition according to claim 1, wherein said milk circulation disposition (2) presents a first part (9a) adapted to provide support to said milk flux selection means (3) and to said milk entry connection (4), and preferentially configured so as to provide an exterior surface that develops in coherent manner in relation to the remanding exterior surface of said discharge casing (1) when said milk circulation disposition (2) is placed in said discharge casing (1), and
wherein said milk circulation disposition (2) further presents a second part (9b) adapted so as to provide support to said vapour entry connection (7),
whereby said first and second structural parts (9a, 9b) are configured as elements that can be manually pressure-fitted with each other.

4. The beverage disposition according to claim 3, characterized in that said first and second structural parts (9a, 9b) are adapted so that support an air valve disposition (10), a flow distribution disposition (11) and a milk discharge (12), along a general upstream to downstream direction.

5. The beverage disposition according to claim 3,
wherein said milk circulation disposition (2) comprises a flow distribution disposition (11) that presents said milk entry connection (4) and said vapour entry connection (7), and
wherein said milk circulation disposition (2) provides flow connection, by means of pressure fitting, with said air valve disposition (10), and with said second beverage discharge (12),
whereby said flow distribution disposition (11) is retained in exterior walls of said first and second structural parts (9a, 9b).

6. The beverage disposition according to claim 1,
wherein said milk flux selection means (3) and said beverage type selection means (5) are provided in different regions and planes of said discharge casing (1), whereby said milk flux selection means (3) are preferentially provided in a side region of said discharge casing (1), and
wherein said selection means (5) of beverage type are provided on a top front region of said discharge casing (1),
whereby said milk flux selection means (3) are disposed on a region of said milk circulation disposition (2) next to and above of flow connection means, in the form of a pipe, of said milk circulation disposition (2) to said milk supply recipient (6).

7. The beverage disposition according to claim 1,
wherein said milk flux selection means (3) can be manually actuated between successive positions along an actuation plane that is at least approximately orthogonal relative to the front plane of said discharge casing (1), thereby providing a regulation of air flow, by means of said air valve disposition (10), in the interior of said milk circulation disposition (2) and therewith of the type of milk flow discharged downstream, and
wherein said milk flux selection means (3) can be moved along a previously defined path, around a respective rotation axis, between a plurality of at least two and up to five, up to three previously defined positions, thereby providing a corresponding variation of the type of discharge flow of said liquid food product to be frothed, whereby at least one position corresponds to a substantially continuous milk flow type and a second position corresponds to a substantially frothed milk flow type.

8. The beverage disposition according to claim 1, characterized in that said discharge casing (1) comprises:
a first fluid discharge line adapted for discharge of a first type of beverage and provided in flow connection with an upstream pressurized flow source, and with a downstream first beverage discharge (15);
a second fluid discharge line for discharge of milk and that comprises:
a first fluid supply adapted for supplying vapour and provided in flow connection upstream with said pressurized fluid source and downstream with a vapour exit nozzle (13),
a second fluid supply adapted for supplying air and that provides flow connection upstream with an air admission (14) associated with said milk flux selection means (3) that provide regulation of the air flow through an air valve disposition (10), and downstream with a flow distribution disposition (11),
a third fluid supply adapted for supplying milk and that provides flow connection upstream with a milk supply recipient (6) provided outside of said beverage preparation machine, and downstream with said flow distribution disposition (11),
whereby said first, second and third fluid supplies, are provided in flow connection downstream, by means of said flow distribution disposition (11), with a second beverage discharge (12), and
whereby said second and third fluid supplies and respective second fluid discharge (12) are provided so that can be flow connected by means of removable pressure-fitting connection of said flow distribution disposition (11) with said vapour entry connection (7), so that said second and third fluid supplies, flow distribution disposition (11) and second beverage discharge (12) can be jointly removed from connection with said first fluid supply.

9. The beverage disposition according to claim 8,
wherein said vapour exit nozzle (13) is adapted for pressure-fitting with a vapour entry connection (7) associated with said flow distribution disposition (11), and
wherein said connection to the milk supply recipient (6) includes the milk entry connection (4) adapted for pressure-fitting between a connection part of milk supply recipient (6) and a connection part of said discharge casing (1).

10. A beverage discharge disposition adapted for frothing a liquid food product, in particular milk, comprising:
a discharge casing (1) provided in a front region of a beverage preparation machine (20),
wherein said discharge casing (1) comprises:
an attached part associated to the discharge casing of said beverage preparation machine (20) and that presents selection means (5) of beverage type, including a milk option, and a first beverage discharge (15) for discharge of a first beverage type, such as for example coffee; and
a part that is removable from the discharge casing (1) and corresponds to a milk circulation disposition (2) providing removable flow connection to an exterior supply recipient (6) to said machine (20), and comprising all components exposed to the milk circulation in said machine (20) including a second beverage discharge (12),
whereby said milk circulation disposition (2) can be manually attached in a removable manner to said attached part of the discharge casing (1), so that said second beverage discharge (12) is arranged next to said first beverage discharge (15) inside of said discharge casing (1), and
wherein said milk circulation disposition (2) comprises:
a milk entry connection (4) that provides connection to a milk supply recipient (6) provided outside of said beverage preparation machine (20),
a milk froth selection means (3) that provide regulation of the air flow through an air valve disposition (10), and
a vapour entry connection (7) that provides connection to a vapour supply provided upstream of said discharge casing (1), by means of a vapour exit nozzle (13) provided on said attached part of said discharge casing (1),
wherein said air valve disposition (10) comprises a regulation disc (17) of air flux, provided in a metal.

11. The beverage disposition according to claim 1, characterized in that said milk entry connection (4) is provided in flow connection with said milk supply recipient (6) by means of a connection that includes at least one location with possibility of rotation around several planes, preferentially including a point of type spherical kneecap, preferentially including a flexible tube (16) provided for sucking milk from said milk supply recipient (6).

12. A machine for preparing beverages, such as for example aromatic beverages, from an edible substance, wherein said machine includes a beverage discharge disposition according to claim 1.

13. A process for preparing a beverage including the steps:
providing a beverage preparation machine (20), or similar apparatus, presenting a flow pressurization device, such as for example a pump, at least one brewing device adapted so that can collect a single portion of edible substance inside thereof and at least one beverage discharge disposition, in particular a beverage discharge disposition according to claim 1,
manual removal of a milk circulation disposition (2) from the attached part of said discharge casing (1) by means of outwards sideways displacement from a corresponding pressure-fitted position of said milk circulation disposition (2) on said attached part of discharge casing (1);
cleaning of the milk circulation disposition (2);
manual placement of said milk circulation disposition (2) by means of inwards sideways displacement into a corresponding pressure-fitted position in said discharge casing (1), including pressurized-fitting of the vapour exit nozzle (13) in the attached part of said discharge casing (1) and vapour entry connection (7) on said milk circulation disposition (2).

14. The process according to claim 13, characterized in that further includes the following steps:
providing a flow connection of said milk circulation disposition (2) with a milk supply recipient (6), preferentially by means of a milk entry connection (4), preferentially by means of a flexible tube;
selecting the option of beverage with milk from the at least three and at most five options provided by beverage type selecting means (5);

manually selecting an option, from at least three and at most five options, of operation of said milk flux selection means (3), by means of moving said milk flux selection means (3) between a first position and a second position corresponding to the desired option;
actuating the start of beverage discharge operation cycle.

* * * * *